(12) United States Patent
Konno

(10) Patent No.: US 8,090,202 B2
(45) Date of Patent: Jan. 3, 2012

(54) DOCUMENT PROCESSING APPARATUS AND PROGRAM

(75) Inventor: Yuya Konno, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 512 days.

(21) Appl. No.: 12/406,652

(22) Filed: Mar. 18, 2009

(65) Prior Publication Data

US 2009/0245641 A1 Oct. 1, 2009

(30) Foreign Application Priority Data

Mar. 25, 2008 (JP) ................................. 2008-077103

(51) Int. Cl.
G06K 9/34 (2006.01)
(52) U.S. Cl. ......... 382/175; 382/173; 382/176; 382/229
(58) Field of Classification Search .................. 382/175, 382/176, 173, 229, 298; 358/448, 452, 462, 358/537; 434/157; 704/2
See application file for complete search history.

(56) References Cited

U.S. PATENT DOCUMENTS

| 5,228,100 | A | * | 7/1993 | Takeda et al. | .................. 382/175 |
| 7,623,716 | B2 | * | 11/2009 | Itonori et al. | .................. 382/229 |
| 7,783,108 | B2 | * | 8/2010 | Aoyagi | .................. 382/176 |
| 2005/0278624 | A1 | | 12/2005 | Nishikawa et al. | |

FOREIGN PATENT DOCUMENTS

| JP | A-5-324720 | 12/1993 |
| JP | A-7-129658 | 5/1995 |
| JP | B2-3636490 | 4/2005 |
| JP | A-2005-352696 | 12/2005 |
| JP | A-2006-268150 | 10/2006 |

OTHER PUBLICATIONS

Mar. 23, 2010 Office Action issued in Japanese Patent Application No. 2008-077103 (with translation).

* cited by examiner

Primary Examiner — Anh Hong Do
(74) Attorney, Agent, or Firm — Oliff & Berridge, PLC

(57) ABSTRACT

A document processing apparatus includes a region extracting unit that extracts a plurality of regions in a document image, a recognition unit that recognizes a character string, a conversion unit that converts the recognized character string, a setting unit that sets first boundary lines that surrounds the document image and at least one second boundary line in a space between adjacent regions of the plurality of regions, an enlargement/reduction unit that moves in parallel at least one line of the first and second boundary lines under a restraint condition that at least one line does not intersect any of the plurality of regions, and enlarges or reduces at least one of the regions in accordance with the parallel movement so long as each region does not get out of a cell; and an insertion unit that inserts the converted character string into each of the regions.

4 Claims, 12 Drawing Sheets

DOCUMENT PROCESSING APPARATUS AND PROGRAM

CROSS-REFERENCE TO RELATED APPLICATION

This application is based on and claims priority under 35 USC 119 form Japanese Patent Application No. 2008-077103 filed Mar. 25, 2008.

BACKGROUND

1. Technical Field

The present invention relates to a document processing apparatus and a program.

2. Related Art

In a system of translating a layout-configured document by a computer and outputting a translation of its document, various methods have been used as expression methods of a translation result.

Of their methods, there has been known well a method of substituting a translated character string (translated sentence), at each region of an original document layout, for an original sentence in its region or a method of adding a translated sentence to its region.

In these related arts, on the basis of character volume of the translated sentence and the size of a region within which the translated sentence is confined, the character size is determined, with the result that the translated sentence fits in the region. Accordingly, in case that the character volume of the translated sentence is large, the character size becomes small, with the result that the translated sentence is hard to read.

Therefore, it is thought to widen the region in order to ensure the character size. However, if the region is widened with no condition, a region where the characters are overlapped appears. Further, it is also thought to search a blank portion around an image by analysis of the image and widen the region toward its blank portion. However, if the region is widened with no limit on the basis of only the securement of the character size, there is possibility that the entire layout balance is lost.

An object of the invention is to, in case that a result of a text in each text region in a document is inserted into (confined within) each text region, keep a layout relation between their text regions while avoiding reduction of the character size as much as possible.

SUMMARY

According to an aspect of the invention, a document processing apparatus includes a region extracting unit that extracts plural of regions in a document image, a recognition unit that recognizes a character string in each extracted region, a conversion unit that converts the recognized character string in each extracted region, a setting unit that sets first boundary lines that surrounds the document image and at least one second boundary line in a space between adjacent regions of the plurality of regions, wherein each second boundary line is a linear line extending to a position blocked by another region, the first boundary lines and the second boundary line define cells for the respective regions, and each cell surrounds the corresponding region an enlargement/reduction unit that moves in parallel at least one line of the first and second boundary lines under a restraint condition that at least one line does not intersect any of the plurality of regions, and enlarges or reduces at least one of the regions in accordance with the parallel movement so long as each region does not get out of the corresponding cell; and an insertion unit that inserts the converted character string into each of the regions at least one of which is enlarged or reduced by the enlargement/reduction unit.

Here, in the enlargement or reduction of a region, a multiplying factor may be different between a vertical direction of a region and a horizontal direction thereof.

BRIEF DESCRIPTION OF THE DRAWINGS

Exemplary embodiments of the invention will be described in detail based on the following figures, wherein.

DETAILED DESCRIPTION

An exemplary embodiment of the invention will be described below with reference to drawings.

Figure 1:
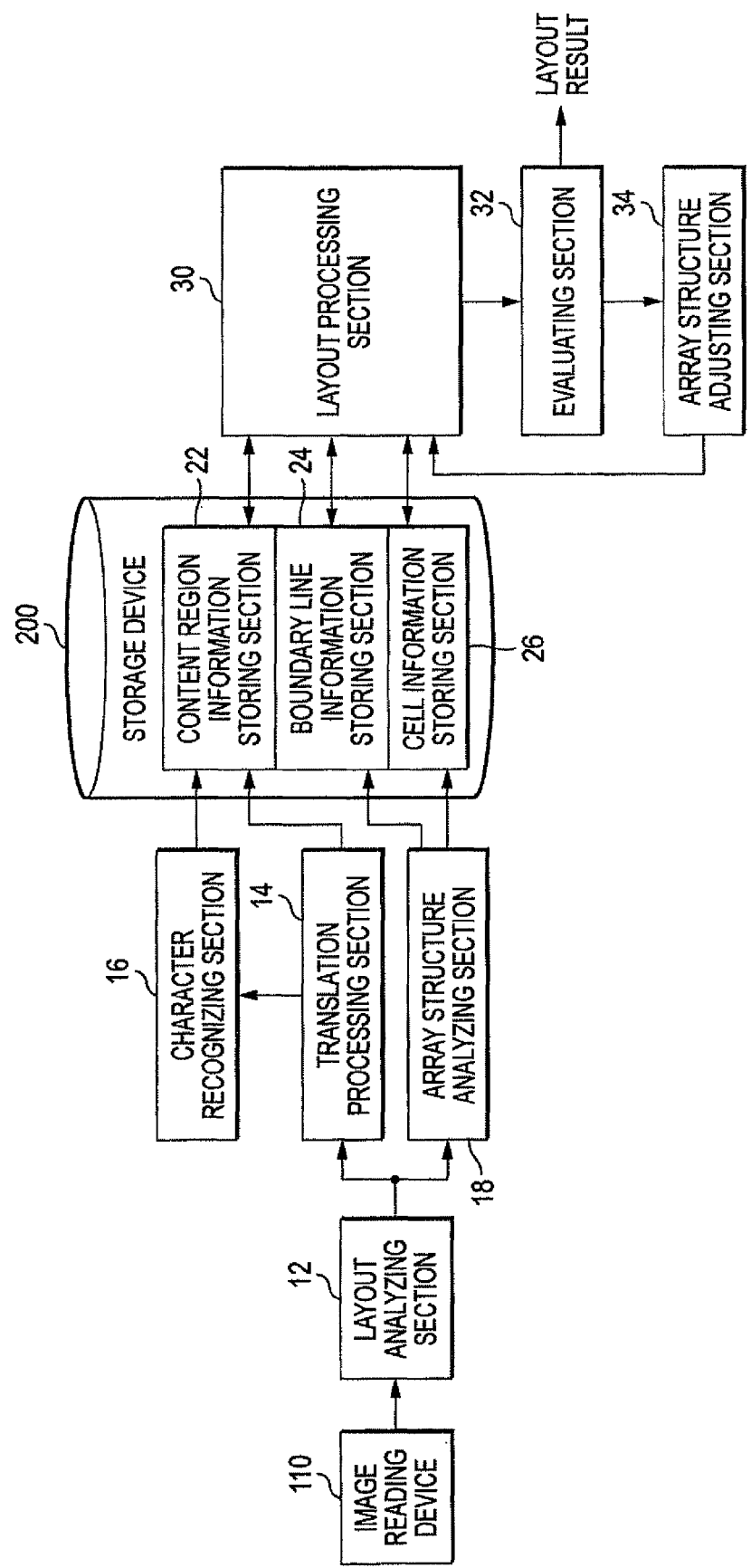
FIG. 1 is a functional block diagram showing an example of a document processing apparatus in an exemplary embodiment.

FIG. 1 shows an example of configuration of a document processing apparatus in the exemplary embodiment. In this apparatus, an image reading device 10 is a device for reading optically an image on a paper document, of which a typical example is a scanner using a line sensor or an area sensor The image reading device 10 outputs a digital image which expresses an image on the paper document. A layout analysis section 12 subjects the digital image outputted from the image reading device 10 to the known layout analysis processing. By the layout analysis, each content region included in the digital image such as a text region or a photographic region is detected. A result of the layout analysis includes, for each content region, position and size information of its region. The content region is typically a rectangular region composed of parallel sides to each of longitudinal and lateral directions of pixel arrangement in the digital image (generally, parallel sides to each of longitudinal and lateral sides of a paper document). For example, a text region is a rectangular region circumscribing a composition result of a text character string. In case that the content region is the above-mentioned rectangular region, the position and size information of its region is expressed by a pair of coordinates of two vertexes on a diagonal line of its rectangle. Further, the layout analysis result may include information indicating the kind of content in its region (for example, information indicating that the content is a text or a photograph).

For example, a layout analysis result 100 shown schematically in FIG. 2 indicates that nine content regions (A to I) (hereinafter, referred to simply as a "region" as long as there is no doubt) are included in a digital image. Assuming that all of the regions A to I are text regions, the following explanation will be given.

A character recognizing section 14 subjects each text region detected as the layout analysis result to the known OCR (optical character recognition) processing, thereby to find a text character string included in each text region. A translation processing section 16 subjects the character string (namely, a sentence described in a language) in each detected text region to the known automatic translation processing, thereby to converts its character string into a character string of another language.

An array structure analyzing section 18 analyzes array structure of regions included in the layout analysis result, and generates information indicating its array structure. In this example, the array structure is expressed by combination of structural boundary lines. The structural boundary line is a straight line segment passing through space between regions adjacent to each other. In case that the content region is rectangular as described above, the structural boundary line includes straight line segments extending vertically or horizontally. The structural boundary line may be a straight line segment passing through a center of a space portion between the regions adjacent to each other.

Further, the structural boundary line is set also in a margin portion of a page periphery. For example, each side of a rectangle formed by widening each side of a circumscribed rectangle including all the content regions in the page toward the outside by a predetermined width may be taken as the structural boundary line of the page periphery.

Further, the array structure analyzing section 18, in case that the space (space width) between the adjacent regions is equal to or larger than a predetermined threshold, sets a blank region at its space portion, and sets a structural boundary line between each of their adjacent regions and its blank region (in other words, sets structural boundary lines in the vicinity of their adjacent regions and sets a blank region between their two structural boundary lines).

Figure 2:
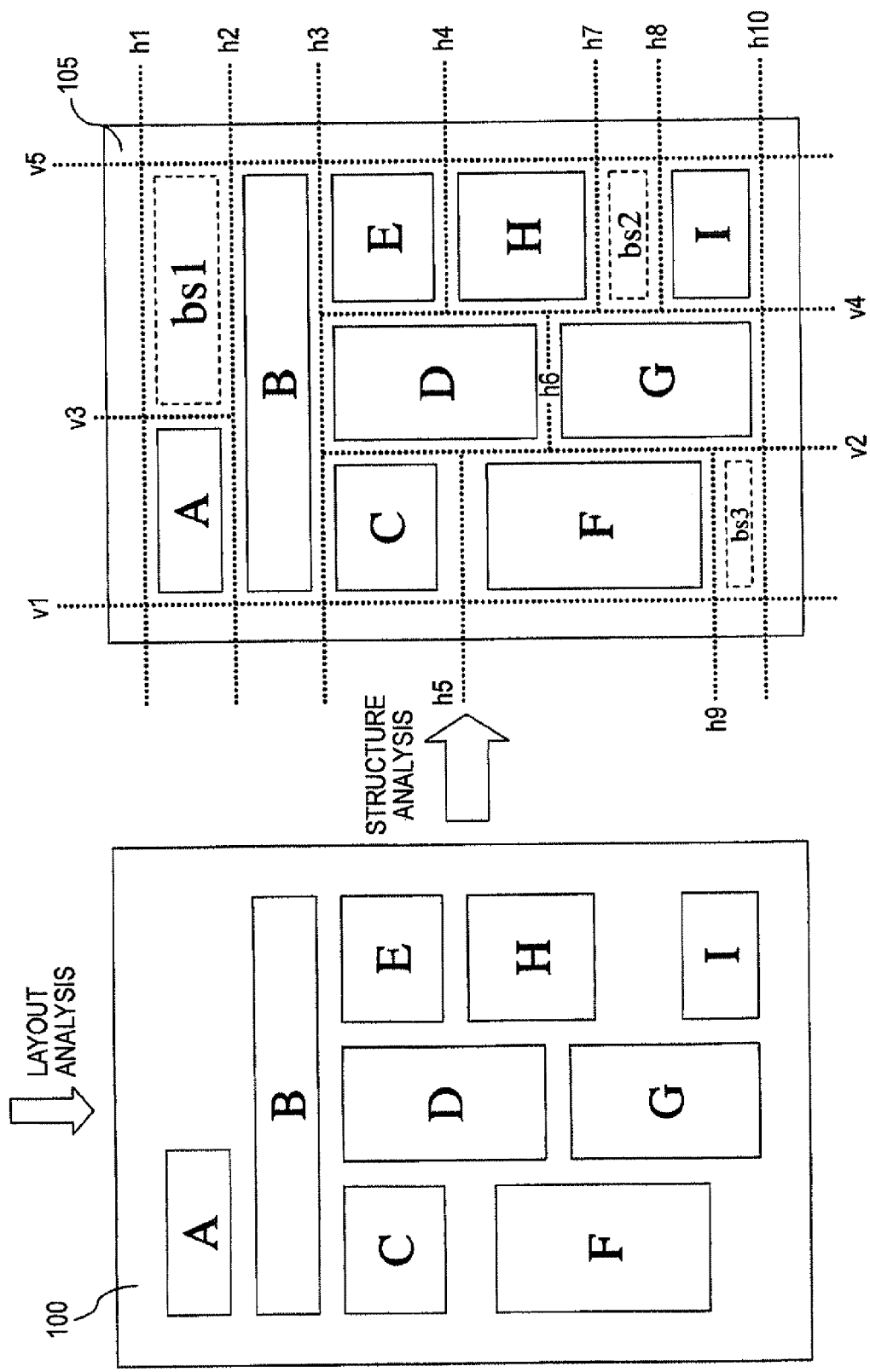
FIG. 2 is a diagram showing examples of a layout analysis result and an array structure analysis result.

FIG. 2 shows schematically an array structure analysis result 105 corresponding to the layout analysis result 100. In this example, the structural boundary line in the vertical direction is denoted by an identification sign of "v-numeral", and the structural boundary line in the horizontal direction is denoted by an identification sign of "h-numeral".

Reference signs v1, h1, v5, and h10 are structural boundary lines of the page periphery. Further, reference signs h2 to h6, and v2 to v4 are respective structural boundary lines between the content regions. Further, between the region A and the structural boundary line V5 of the periphery, a blank region bs1 is set; between the region H and the region I, a blank region bs2 is set; and between the region F and the structural boundary line V10 of the periphery, a blank region bs3 is set.

Reference signs v3 and h7 to h9 are structural boundary lines between the content region and the blank region. Namely, since the space between the region A and the structural boundary line of the page periphery is larger than a predetermined threshold, the structural boundary line v3 is set in a position apart from a right end of the region A to the right side by a predetermined distance, and a rectangular region surrounded by the lines v3, h2, v5, and h1 is managed as the blank region bs1. In other words, in case that another region does not exist between a region and a structural boundary line of the page periphery, and the space between its region and its structural boundary line is apart from each other by a predetermined distance or more (i.e., the before-mentioned threshold), a blank region is set between them. The blank region is thus set, in case that space which is wide to a degree exists between the regions (or between the region and the page periphery), in order to take its space as a layout intention in the original document, and manage its space so as to keep its space as much as possible.

As shown in FIG. 2, a structural boundary line, as long as its extending direction is not blocked by a content region, extends to a point at which its structural boundary line intersects a structural boundary line of the page periphery intersects. For example, the structural boundary lines h2 and h3 extending in the horizontal direction, since the regions blocking the extending direction of their lines do not exist, extend from the left structural boundary line V1 of the page periphery to the right structural boundary line V5 thereof. On the other hand, in case that the extending direction is blocked by a content region, a structural boundary line, when arrives at a structural boundary line which is located in front of its blocking region and vertical to the structural boundary line (in other words, when arrives at a structural boundary line with which its blocking region and regions adjacent to the structural boundary line are separated), ends the extension. For example, the left and right of the structural boundary line h6 extending in the horizontal direction are blocked by the regions F and H, and the line h6 is a line segment extending from the structural boundary line v2 located in front of the line h6 to the structural boundary line v4. Further, since the upside of the structural boundary line h2 extending in the vertical direction is blocked by the region B, the line h1 is a line segment extending from the structural boundary line h3 extending in the horizontal direction to the structural boundary line h10 extending in the horizontal direction.

In case that positional information of each region on a digital image (page) is known, the structural boundary lines v1, h1, v5, and h10 of the page periphery can be firstly drawn as described above, that is, the position of each structural boundary line in coordinates system of the digital image can be determined. Here, a position of a structural boundary line can be expressed, taking the horizontal direction of the digital image as an x-axis direction and the vertical direction thereof as y-axis direction, by an x-axis coordinate of its boundary line (in case of a vertical boundary line) or a y-axis coordinate thereof (in case of a horizontal boundary line), and other two structural boundary lines coming into contact with both ends of its boundary line. For example, the structural boundary line h1 can be expressed by a y-coordinate value of its line h1 and the boundary lines v1 and v5 which define both ends of its line h1. Next, each structural boundary line having structural boundary lines of the periphery as both ends of its line can be drawn, and then a structural boundary line having this drawn structural boundary line and the structural boundary line of the periphery as both ends of its line can be drawn. Thereafter, a structural boundary line (for example, h6) having their structural boundary lines as both ends of its line can be drawn.

Further, the array structure analyzing section 18 generates relational information indicating a relation between the structural boundary lines obtained as described above and each region. As an example of such the relational information, information indicating one set composed of four structural boundary lines surrounding a region can be used. Hereafter, a rectangular range surrounded by the upper, lower, left and right structural boundary lines of a region is referred to as a "cell". As the above-mentioned relational information, information indicating a corresponding relation between a cell and a region included in its cell is used.

A storage device 20 is a primary storage such as RAM (random access memory) provided for the document processing apparatus, or a secondary storage such as a hard disk or a nonvolatile memory. The layout analysis result by the layout analyzing section 12, the character recognition result by the character recognizing section 14, and the translation result by the translation processing section 16 are stored in a content region information storing section 22 in the storage device 20. Further, a part of the array structure information analyzed by the array structure analyzing section 18 is stored in a boundary line information storing section 24 and a cell information storing section 26.

Figure 3:
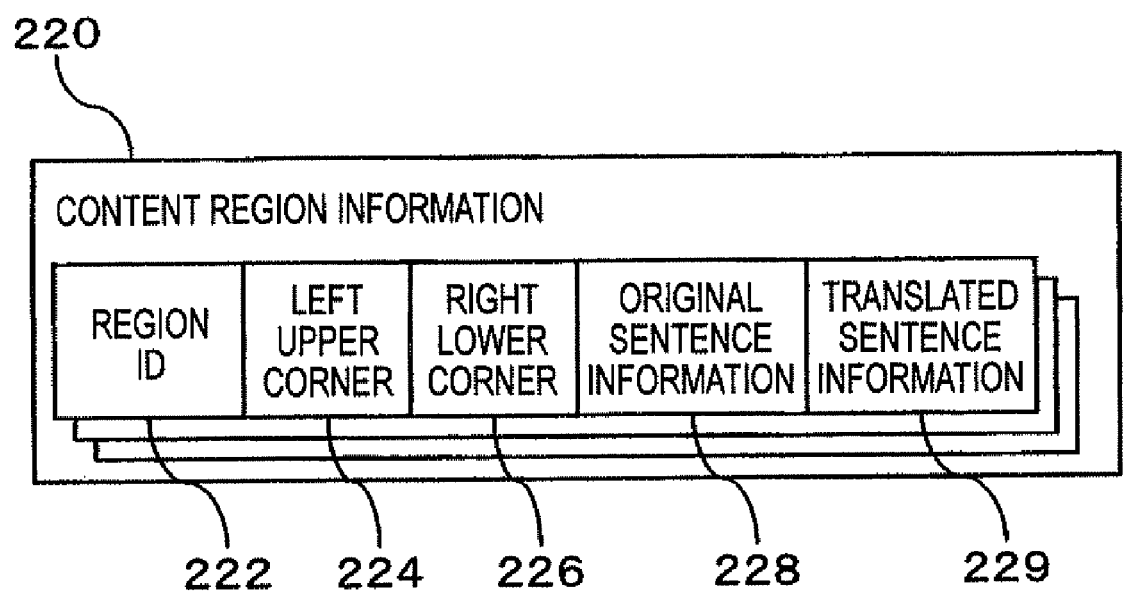
FIG. 3 is a diagram showing an example of data structure of content region information.

An example of data structure of a content region information 220 stored in the content region information storing section 22 is shown in FIG. 3. In this example, the content region information 220 includes, for each region, a region ID 222 which is an identification data of its region, coordinates 224 of a vertex located at a left upper corner of its region (rectangle), coordinates 226 of a vertex located at a right lower corner of its region, original sentence information 228 and translated sentence information 229. The region ID 222, in case that the layout analyzing section 12 has detected each content region, should be given. The coordinates 224 and 226 of the points located at the left upper corner of the rectangular region and at the right lower corner thereof become clear also from the analysis result by the layout analyzing section 12. Further, in case that the array structure analyzing section 18 sets a blank region, a region ID may be given also to its blank region to manage the blank region similarly. The original sentence information 228 is a character string that indicates a character recognition result for the image in the region by the character recognizing section 14, and font size information (this may be obtained in character recognition) of its character string may be incorporated in the original sentence information 228. The translated sentence information 229 is a character string that indicates a translation result for its character string by the translation processing section 16. Regarding the blank region, in place of the original sentence information 228 and the translated sentence information 229, information indicating that its region is blank may be stored.

Figure 4:
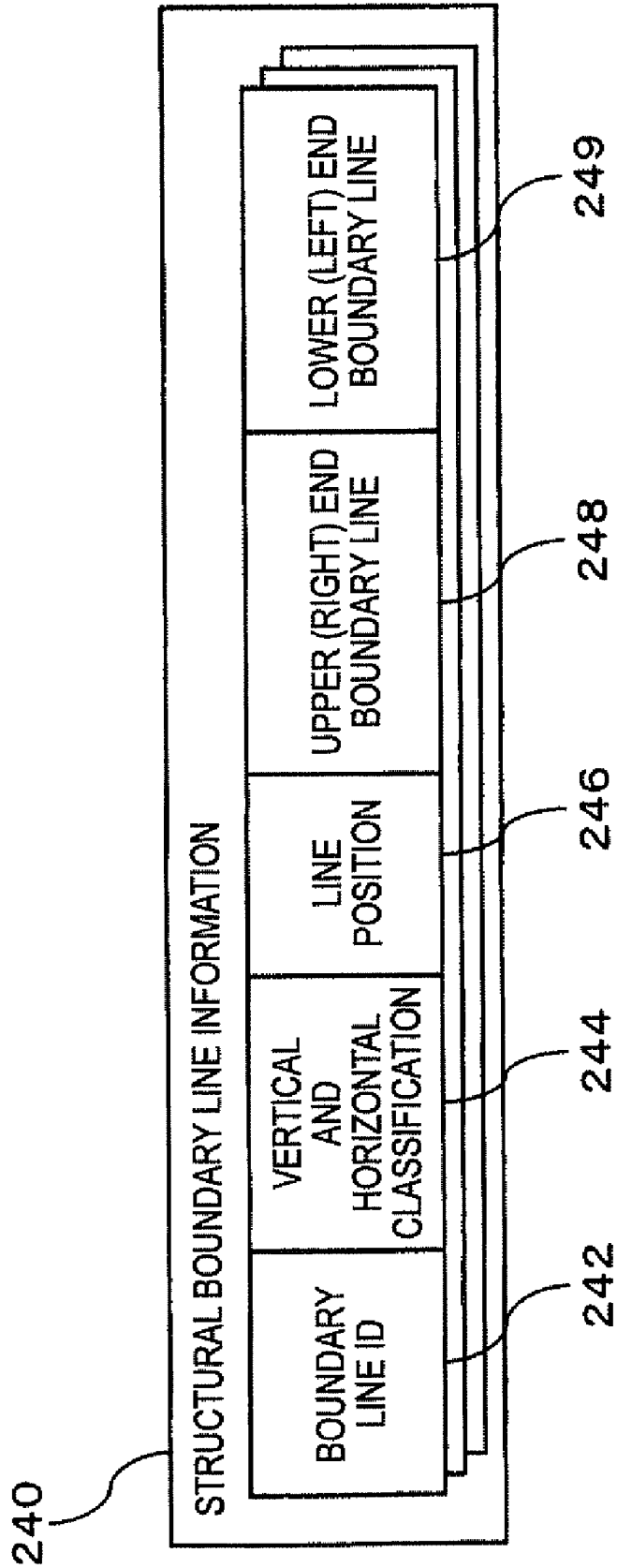
FIG. 4 is a diagram showing an example of data structure of structural boundary information.

An example of data structure of a structural boundary line information 240 stored in the boundary line information storing section 24 is shown in FIG. 4. In this example, the structural boundary line information 240 includes, for each structural boundary line obtained by the array structure analyzing section 18, the following items: a boundary line ID 242 which is an identification data of its boundary line; a vertical/horizontal classification 244 indicating that its boundary line is either a vertical boundary line or a horizontal boundary line; a line position 246 indicating a position of its boundary line; and upper (right) end boundary line 248 and lower (left) end boundary line 249 indicating boundary line ID's of other boundary lines defining both ends of its boundary line. The boundary line ID 242 should be given by the array structure analyzing section 18. The line position 246, as described above, should be expressed, in case of a structural boundary line extending in a vertical direction, by an x-coordinate of its line, and should be expressed, in case of a structural boundary line extending in a horizontal direction, by a y-coordinate of its line. The values of the items 244 to 249 can be obtained from the analysis result by the array structure analyzing section 18.

Figure 5:
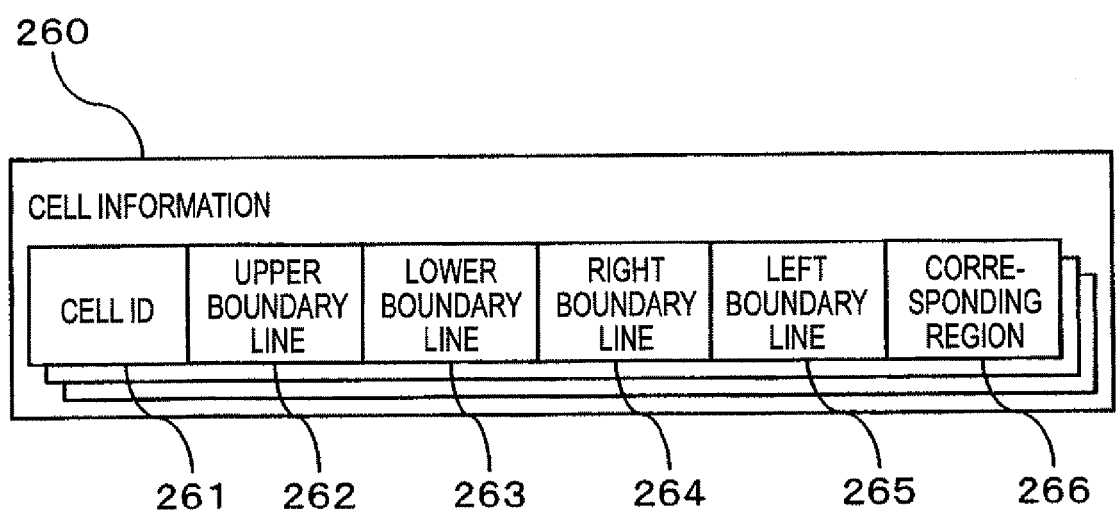
FIG. 5 is a diagram showing an example of data structure of cell information.

An example of data structure of a cell information 260 stored in the cell information storing section 26 is shown in FIG. 5. In this example, the cell information 260 includes, for each cell obtained by the array structure analyzing section 18, the following items: a cell ID 261 which is an identification data of its cell; a boundary line ID (upper boundary line 262, lower boundary line 263, right boundary line 264, and left boundary line 265) of each structural boundary line defining an upper, lower, left or right end of its cell; a region ID of a region included in its cell (corresponding region 266). For example, in FIG. 2, the cell information 260 of a cell including the region A therein includes the respective ID's of h1, h2, v1 and v3 as the upper boundary line 262, the lower boundary line 263, the right boundary line 264 and the left boundary line 265; and ID of the region A as the corresponding region 266.

Regarding four sides (structural boundary lines) constituting a cell, the distance between each side and the region in its cell may be previously obtained and its distance may be included in the cell information 260.

Turning to FIG. 1, a layout processing section 30, on the basis of the content region information 220, the structural boundary line information 240 and the cell information 260 obtained by the layout analyzing section 12, the character recognizing section 14, the translation processing section 16, and the array structure analyzing section 18, in order to generate, for each content region, an image in which a translated sentence is added at the back of the original sentence, executes simulation of layout. This simulation is performed on the basis of the set of structural boundary lines stored in the boundary line information storing section 24.

An evaluating section 32 evaluates a result of its simulation. The evaluating section 32, in case that the layout result of an original sentence and a translated sentence in a region gets out of the original digital image or gets out of a cell corresponding to its region, or in case that a distance between each side of its cell and the layout result is smaller than a predetermined lower limit, decides that its layout result is bad. Further, the evaluating section 32, in case that the layout results in all regions do not get out of the original digital image, the layout results of each original sentence and each translated sentence in all regions fit in each of the corresponding cells, and the distance between each layout result and each side of each corresponding cell is equal to or larger than the lower limit, decides that its layout result is good. In case that the evaluating section 32 decides that the layout result is good, it outputs its layout result.

On the other hand, in case that the evaluating section 32 decides that the layout result is bad, it instructs an array structure adjusting section 34 on adjustment of array structure.

An array structure adjusting section 34, by moving the position of the structural boundary line (that is, by parallel movement), or by enlarging or reducing the structural boundary line (hereinafter referred to as enlargement/reduction), adjusts the array structure of each region. The array structure adjusting section 34 subjects the structural boundary line to only the parallel movement or enlargement/reduction, and deformation of the structural boundary line is not permitted The movement of the structural boundary line (including the movement accompanied by the enlargement/reduction) is permitted in only a direction where a content region does not exist. For example, for the structural boundary lines of the page periphery, the parallel movement toward the outside of the page is permitted. However, such the movement that the margin width remaining at the page periphery becomes equal to or smaller than a predetermined width (previously set) is not permitted. Further, in case that a blank region exists next to the structural boundary line, the structural boundary line is allowed to move in parallel in the direction of its blank region.

The array structure adjusting section 34, in case that there are plural structural boundary lines that are allowed to move, moves a structural boundary line determined by a previously set moving strategy as a structural boundary line to be firstly moved, by distance determined by its strategy or to a degree determined by its strategy. The moving strategy is information for determining how which structural boundary line is moved at each stage. For example, on the basis of the moving strategy, at a first stage, the entire structural boundary line is enlarged till the margin at the page periphery becomes a lower limit; and at a second stage, the structural boundary lines are moved till the widths of all the blank regions become half.

An adjusting result by this array structure adjusting section 34 is reflected on the structural boundary line information 240 in the storage device 20. Thereafter, the layout processing section 30, with the sets of structural boundary lines after the adjustment as a constrained condition, inserts, in each cell, original sentence information and translated sentence information in the corresponding content region (performs so-called "character-confining"), thereby to perform re-layout.

Next, the evaluating section 32 evaluates a result of its re-layout. In case that the evaluation result is bad, the array structure adjusting section 34 performs second adjustment in accordance with the moving strategy.

The invention, by repeating a cycle of the above structure adjustment, re-layout and evaluation, aims at creation of a layout in which all the content regions fit in the corresponding cells and do not get out of the page.

Figure 6:
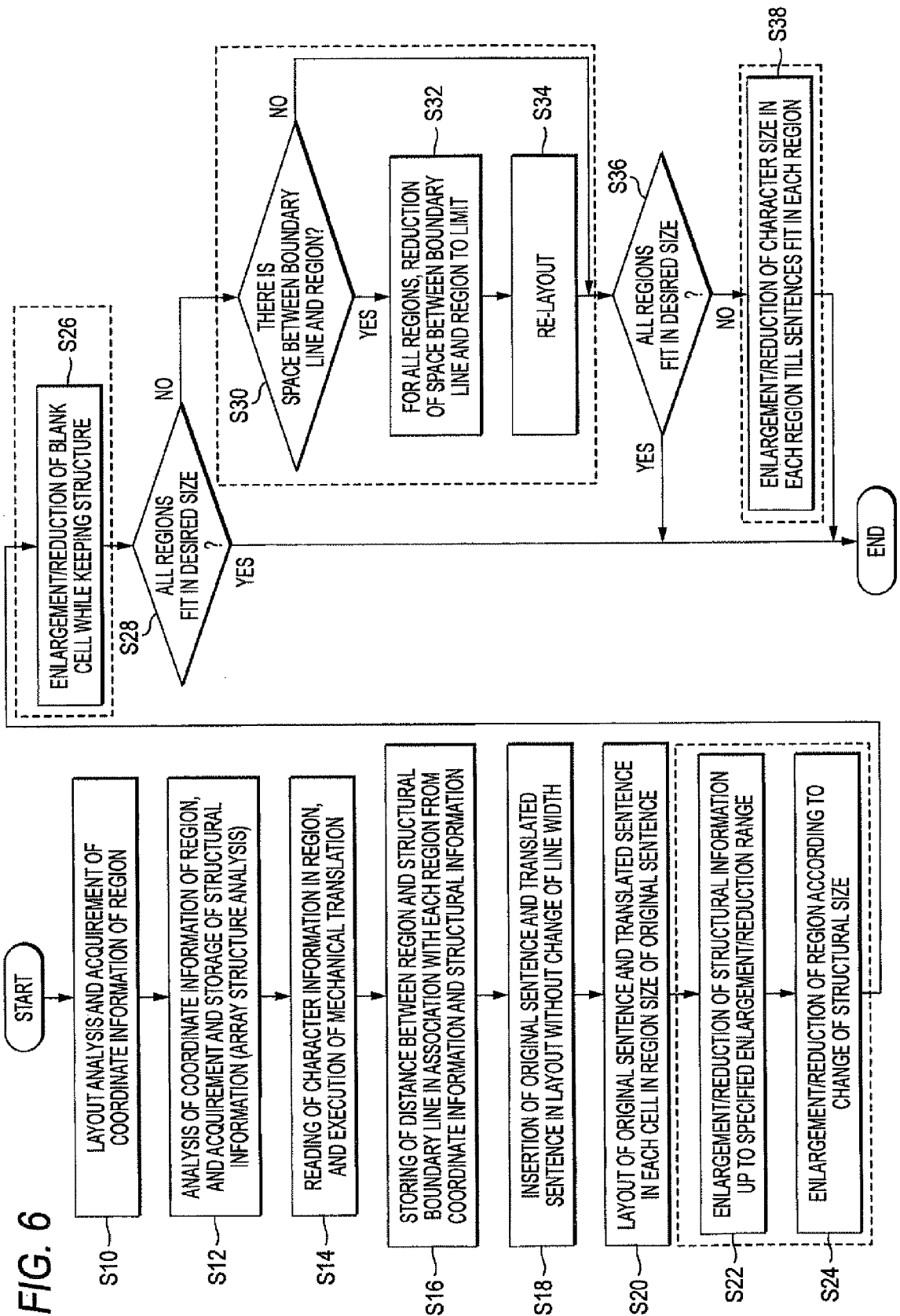
FIG. 6 is a flowchart showing an example of a procedure of processing executed by the document processing apparatus in the exemplary embodiment.

FIG. 6 shows an example of a procedure of processing executed by this document processing apparatus. This procedure is an example in case that sentences in all the text regions are written horizontally.

In this procedure, a digital image outputted as a reading result from the image reading device 10 is layout-analyzed by the layout analyzing section 12 (S10), and further the array structure analyzing section 18 finds array structure (set of structural boundary line information and cell information) as its layout analysis result (S12). Further, the character recognizing section 14 performs character recognition for each region after the layout analysis result, and the translation processing section 16 executes translation processing for its character recognition result (S14). Further, in this procedure, the array structure analyzing section 18 finds a distance between each region of the layout analysis result and the structural boundary line near each region, and stores its distance in association with the region (that is, in either content region information or cell information) (S16). By the above processing, in the storage device 20, the content region information 220, the structural boundary line information 240 and the cell information 260 are stored.

Figure 7:
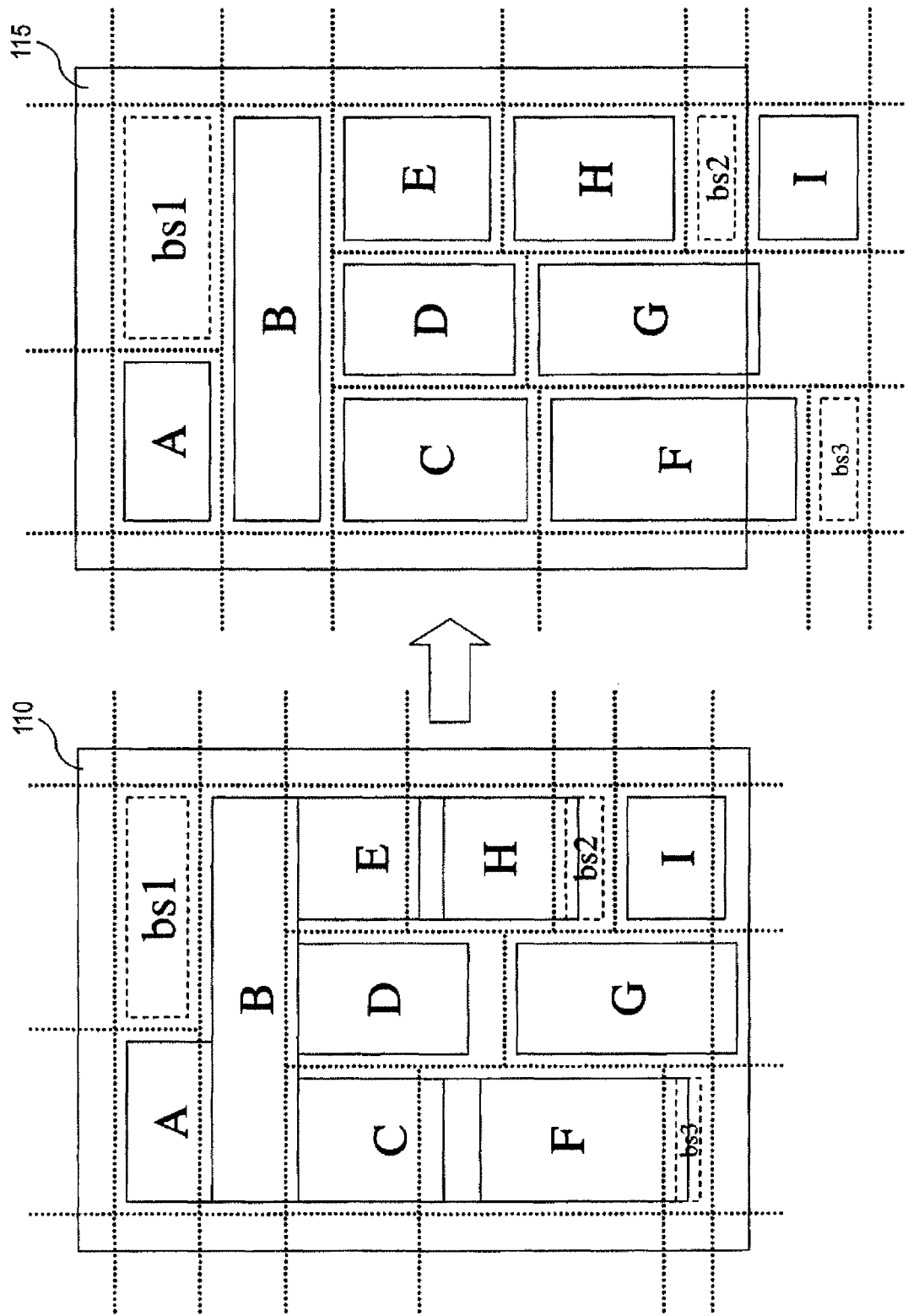
FIG. 7 is a diagram showing schematically a state where original sentences and translated sentences are inserted in the array structure obtained from an original image, with the result that content regions get out of cells, and a state where each structural boundary line is moved downward so that each content region fits in a corresponding cell.

Next, the layout processing section 30, referring to each of their information 220 to 260, without changing the width of each region, lays original sentence information and translated sentence information in order of horizontal writing in each region (S18), and sets a layout result in each region in the corresponding cell (S20). The width of each region may be obtained from information of the left upper corner 224 and information of the right lower corner 226 which correspond to the region and are included in the content region information 220. At this time, the layout result is set so that an upper end and left and right ends of each region are put in positions apart from an upper side and left and right sides of the cell by the distance stored in the step S16. In this example, correspondingly to the volume of the translated sentences, each region extends downward. For example, when the processing in the step S18 is performed for the array structure analysis result of FIG. 2, a layout result 110 shown in FIG. 7 is obtained. Here, by coordinates at a left upper corner and a right lower corner of each region in this layout processing result, the information of each region in the content region information 220 may be updated.

In the example of FIG. 7, each region in the layout result gets out of the corresponding cell. Accordingly, the evaluating section 32 determines that this layout result is bad, and the array structure adjusting section 34 performs the corresponding adjustment.

At this time, the array structure adjusting section 34 firstly enlarges or reduces the entirety of the array structure as an example (enlarges the array structure in the example of FIG. 7) (S22), and enlarges or reduces the region in each cell according to its enlargement/reduction (S24). For example, the array structure adjusting section 34, for the layout result 110 in FIG. 7, enlarges the array structure vertically in the down-direction (that is, moves the horizontal structural boundary lines h2 to h10 in parallel in the down-direction, and further moves each region downward, whereby the respective regions A to F in the layout result 110 fit in the corresponding cells. Hereby, an array structure adjusting result 115 is obtained. Since the line position of each structural boundary line changes according to this adjustment, the line position 246 of each boundary line in the boundary line information storing section 24 is updated according to its change. The vertical and horizontal classification 244, the upper (right) end boundary line 248 and the lower (left) end boundary line 249 do not change in the adjustment processing of the array structure.

Since some regions get out of the page in this adjustment result, the entirety of the array 10 structure is enlarged more in this example.

Figure 8:
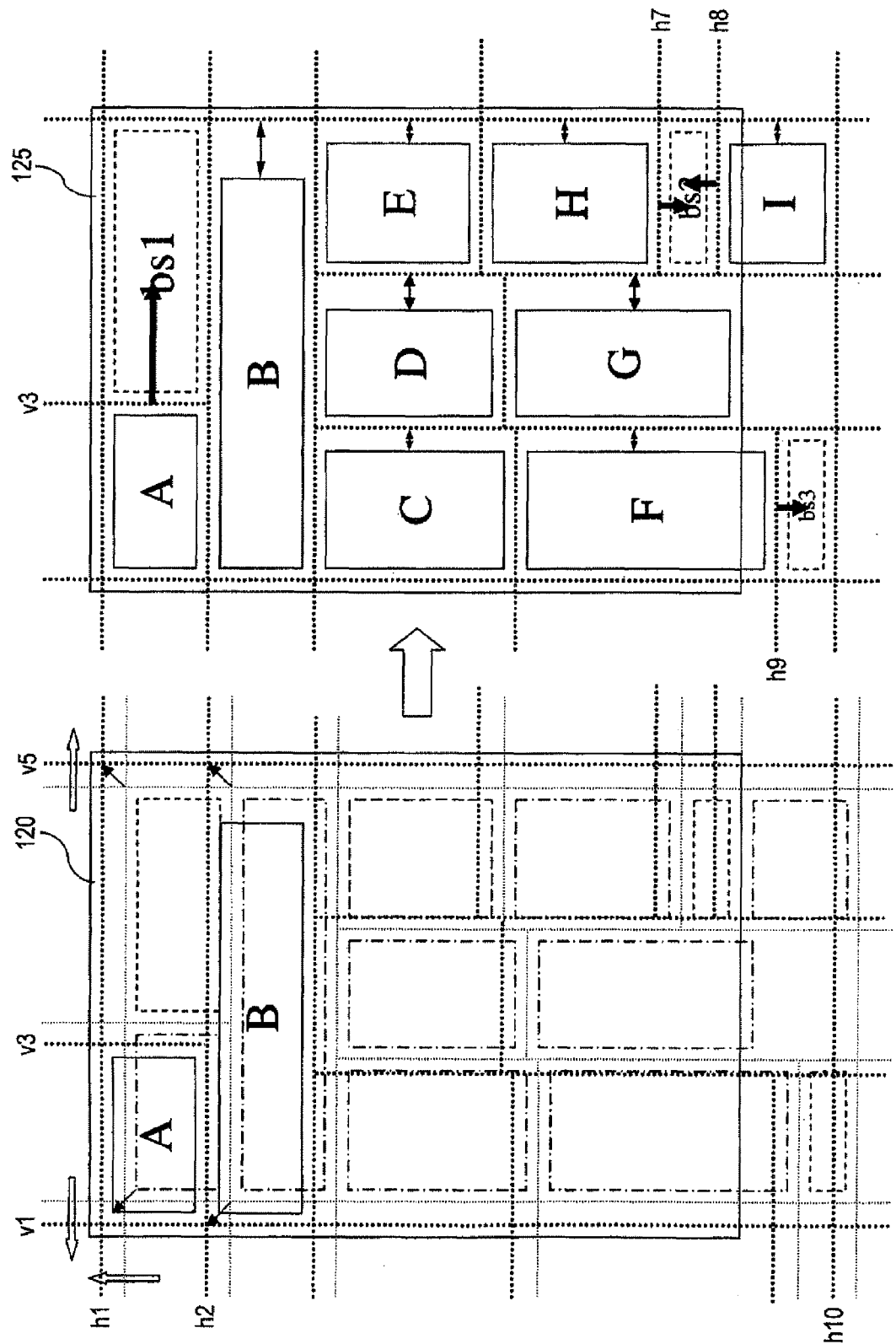
FIG. 8 is a diagram for explaining enlargement of the structure entirety.

For example, as shown in an example 120 of FIG. 8, the structural boundary line h1 of the page periphery is moved upward to a predetermined distance from the page upper end, the structural boundary line v1 is moved to the left to a predetermined distance from the page left end, and the structural boundary line v5 is moved to the right to a predetermined distance from the page right end. With this movement, the region A located at the page left upper corner is moved in parallel to the position apart from the line v1 and the line h1 by the distance stored in the step S16. Further, with this movement, the line h2 and the line v3 are moved to the position apart from the region A by the distance stored in the step S16. Next, the region B is moved in parallel to the position apart from the line v1 and the line h2 by the distance stored in the step S16. By repeating the above-described linked movement of the region and the structural boundary lines, an array structure enlargement result 125 on the right side in FIG. 8 is obtained. Since the line position of each structural boundary line changes according to this enlargement, the line position 246 of each boundary line in the boundary line information storing section 24 is updated according to its change.

As shown in this enlargement result 125, according to the enlargement of the array structure, each cell becomes large (or there is no change in size of each cell), but the size of each content region does not change. For example, the regions B to I can have in the respective cells such space that the region width can be extended to the right side. Further, the structural boundary line v1 can be moved in parallel to the blank region bs1 located on the right side, the structural boundary line h7 can be moved in parallel to the blank region bs2 located on the lower side of the line h7, the structural boundary line h8 can be moved in parallel to the blank region bs2 located on the upper side of the line h8, and the structural boundary line h9 can be moved in parallel to the blank region bs3 located on the lower side of the line h9.

Therefore, the array structure adjusting section 34 enlarges any one or more of the regions B to I in the right direction so that its region does not get out of the cell (S24). Since the width of the region increases by this enlargement, in case that the same sentences are inserted in the region, the number of sentence lines decreases. Accordingly, in the region subjected to this enlargement processing, the vertical width is reduced. Assuming that the upper end of the region is fixed (namely, in case that the information is inserted in order from the upside), the lower end of the region moves up resultantly. The array structure adjusting section 34 determines the number of sentence lines for its region width by performing simulation of inserting the character string in its region, and calculates a height of the region from the determined number of sentence lines. Further, the array structure adjusting section 34 determines the moving-up amount of the region lower end from a result of this calculation, and moves upward a structural boundary line located below the lower end of its region correspondingly to its moving-up amount. However, in case that another region exists above the "structural boundary line located below the region lower end", the moving-up of its structural boundary line is limited so that the distance from "another region" does not become equal to or smaller than the value stored in the step S16.

Further, the array structure adjusting section 34 moves any one or more of the boundary lines v1, and h7 to h8 toward the blank region thereby to widen the cell, and enlarges the region in the widened cell toward the corresponding blank region (S26). Since the number of sentence lines in its region decreases by this enlargement, the lower end of its region moves up. Accordingly, the boundary line and the region which are located below its region can be moved up.

The above-mentioned steps S22 to S26 may be executed in any order.

Figure 9:
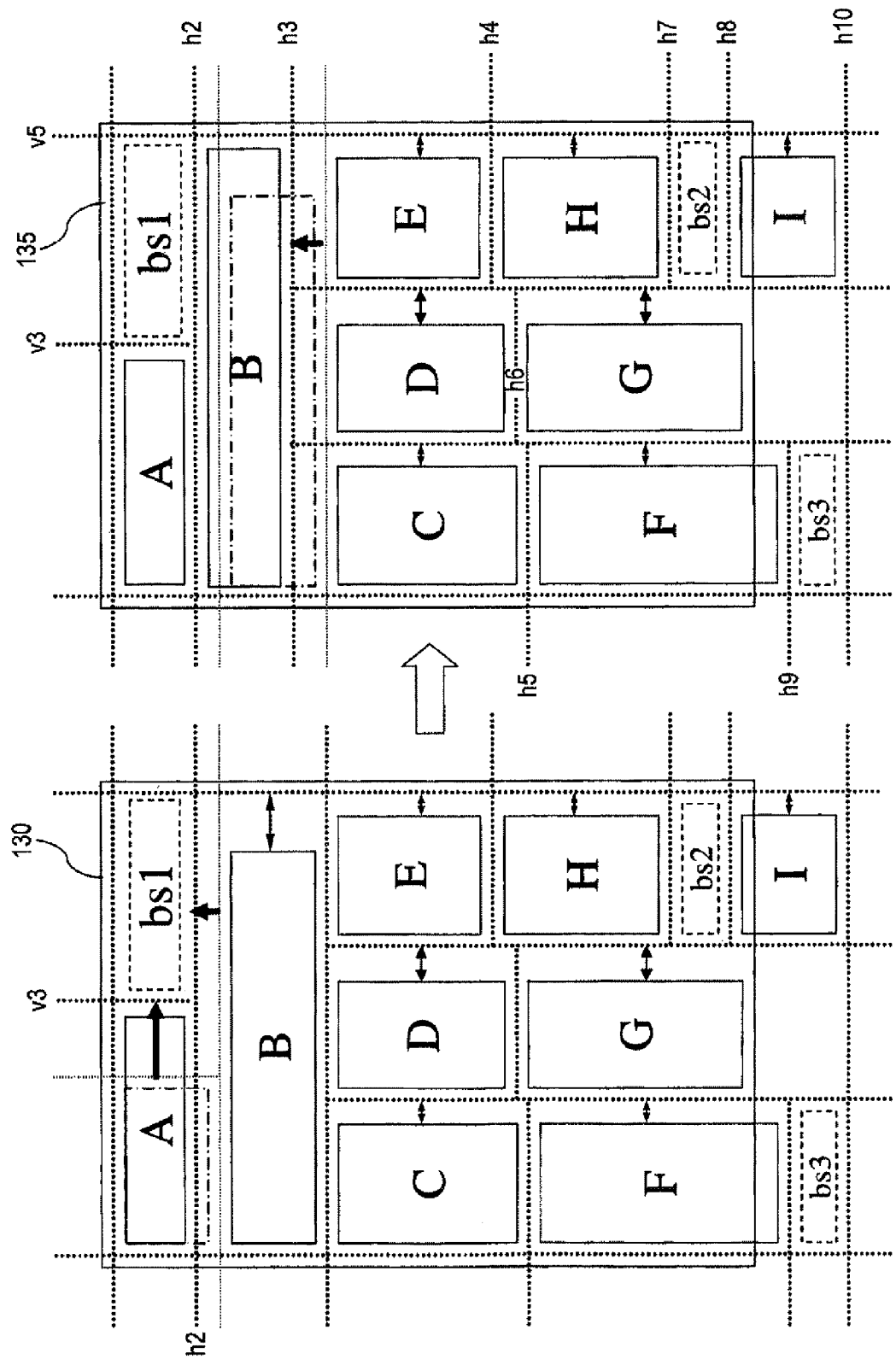
FIG. 9 is a diagram for explaining a flow of adjusting the array structure by moving the structural boundary lines toward blank regions.

For example, a state 130 shown in FIG. 9 shows an example in case that the boundary line v3 is moved to the right by the predetermined amount. Accordingly to this movement, the width of the region A is extended to the right by the same amount. Hereby, similarly to the above-mentioned case, the lower end of the region A moves up. Since a region restricting the movement-up of the boundary line h2 located below the region A is only the region A (bs1 is blank), the boundary line h2 is also moved by the same moving-up amount as the moving-up amount of the lower end of the region A. The state 130 in FIG. 9 shows this state.

Next, the region B is moved up by the same amount as the moving-up amount of the boundary line h2. Since the region B can be enlarged to the right in the cell, the width of the region B is widened till the distance from the boundary line v5 comes to the distance stored in the step S16. The number of lines decreases by this widening, and the lower end of the region B moves up. Accordingly to this moving-up, the boundary line h3 is moved up. A state 135 in FIG. 9 shows this state.

Thereafter, the regions C, D and E are moved up till the distance of each region from the boundary line h3 comes to the distance stored in the step S16. Further, in cooperation of this movement-up, each region and each boundary line located below the regions C, D and E are moved up. Further, by enlarging the regions C to I in their respective cells or reducing the heights of the blank regions bs2 and bs3, the array structure entirety can be compressed more upward.

Further, if the blank region bs1 remains, the boundary line v3 may be moved more to the right to repeat the similar processing to the above-mentioned processing. Further, a condition of compression limit of the blank region may be determined to make it impossible to compress the blank region beyond its limit. Such the condition may be, for example, a lower limit width (height) of the blank region, or a compression ratio to the width (height) of the original blank region.

Figure 10:
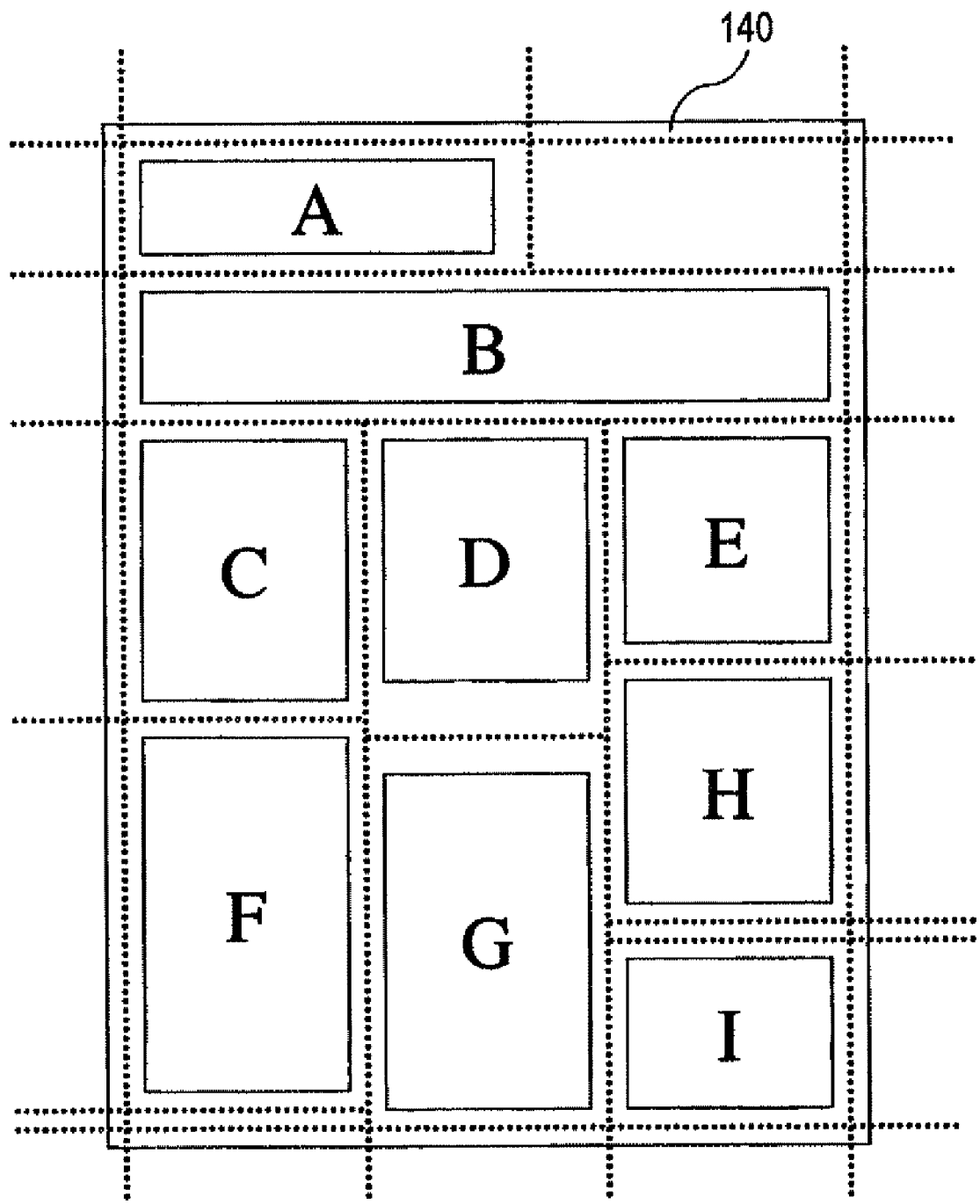
FIG. 10 is a diagram showing schematically a layout result obtained finally.

In case that all the regions fit in the page range like a state 140 shown in FIG. 10 by repeating the above steps 822 to S26 (in other words, in case that the boundary lines of the page periphery fit in the page) (in case of Yes in a step S28), the processing ends.

Figure 11:
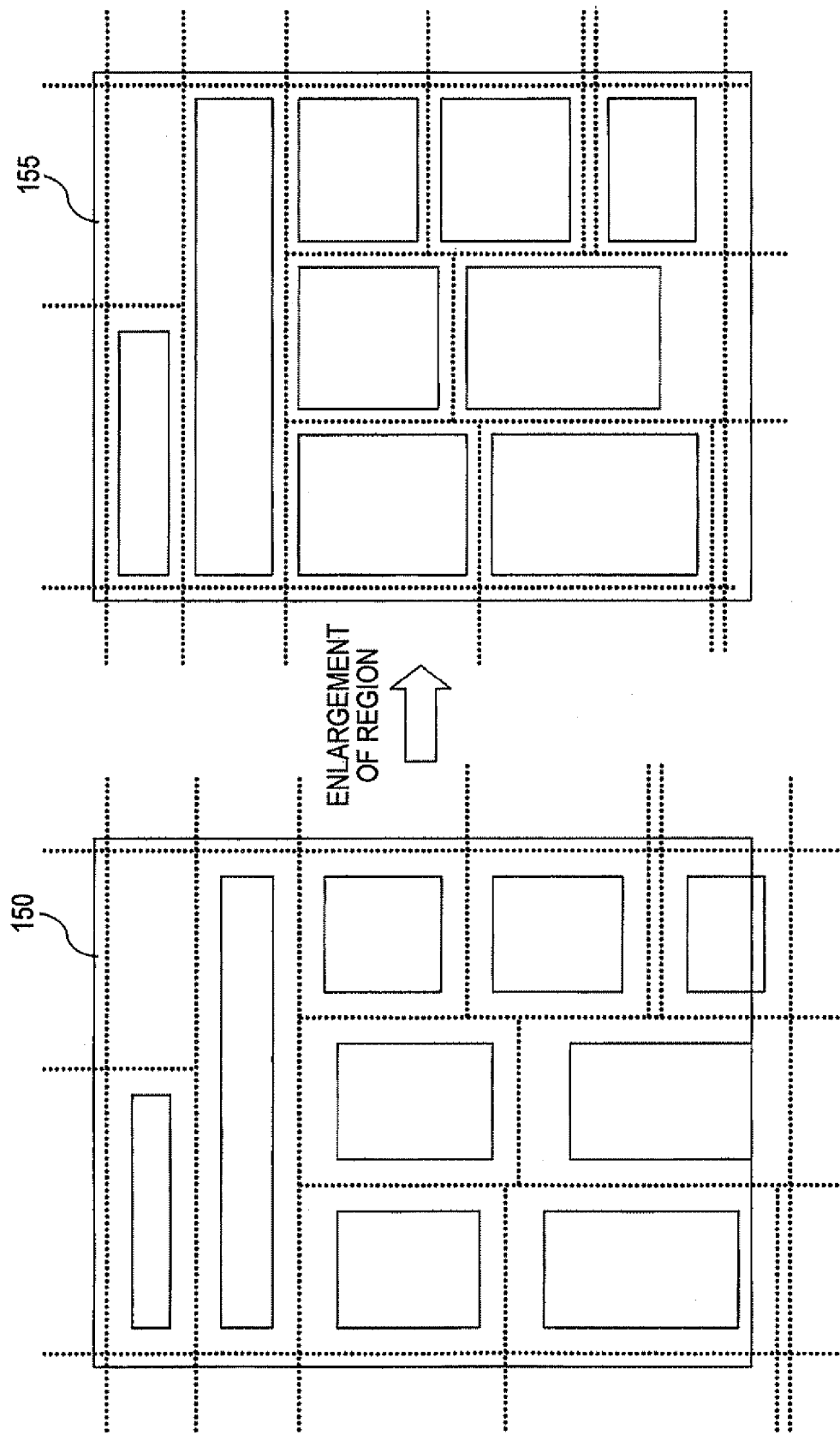
FIG. 11 is a diagram showing schematically a state where there is space between a region and a cell, and a state where the space between them is cut.

In the above processing, in case that any region (or the structural boundary line) gets out of the page (in case of No in the step S28) even if the margin at the page periphery and all the blank regions are reduced up to the previously set limit, the distance between the region and the cell may be reduced to reduce the array structure entirety more. In this case, the array structural adjusting section 34 determines whether there is space between each region and each structural boundary line of the cell corresponding to its region (S30). For example, in case that the distance between a region and structural boundary lines constituting a cell including its region therein exceeds a previously set threshold like a state 150 in FIG. 11, the array structural adjusting section 34 determines that there is space. The distance between the region and each structural boundary line of the cell, which has been determined as space, is reduced up to a limit (S32), and arrangement of the regions and the structural boundary lines is re-designed according to its reduction (S34).

Namely, in the processing up to the step S28, the distance between the region and each structural boundary line of the corresponding cell becomes the distance stored in the step S16, that is, is kept at the distance between the region and each boundary line of the corresponding cell in the original digital image. In case that its distance is larger than the threshold, the width of the region is enlarged in the step S30, and the distance between the region and the structural boundary line right over its region is reduced, whereby the distance between the region and the cell is reduced up to the threshold. By the increase of the region width and movement-up of the region entirety, the lower end of its region is moved up. Therefore, a structural boundary line located below its region, and each region and each structural boundary line located below its structural boundary line can be moved up. For example, by performing such the processing in order from a page topmost region, a lower end of the page can be moved up. Hereby, when all the regions fit within the page as shown in a state 155 of FIG. 11 (in case of Yes in the step S36), the processing ends.

In case that all the regions do not fit within the page, the character size in each region may be reduced stepwise till all the regions fit within the page (S38). The reduction of the character size in the step S38 is not applied to all the characters but may be partially applied in such a manner that the character size reduction is applied to only headline characters obtained by headline analysis.

Though the procedure in FIG. 6 has been described above, the execution order of the steps S22 to S26, S30 to S34, and S38 surrounded by in dotted lines in FIG. 6 is not limited to the shown order, but their steps may be executed in any order.

As described above, in the exemplary embodiment, structural boundary lines with which the respective regions are separated are set, the structural boundary lines are moved in parallel without being deformed, and the width or the height of each corresponding region is widened, according to its parallel movement, in a cell in which each region is included, whereby the character volume that can fit in each region is increased. In this method, the movement and the enlargement/reduction of each region are restricted by the structural boundary lines, and the structural boundary lines can perform only the parallel movement but do not deform. Therefore, as the page entirety, the array structure of regions can be kept.

Further, in the exemplary embodiment, as a first step of array structure adjustment, it is permitted only to move structural boundary lines of the page periphery outward of the page, or to move structural boundary lines adjacent to a blank region in the direction where the blank region is reduced, and other structural boundary lines are allowed only to move with the movement of the first structural boundary lines. Hereby, the array structure can be kept.

Further, in the exemplary embodiment in case that the distance between adjacent regions is larger than the predetermined threshold, a blank region is set between their regions, and structural boundary lines are set respectively between one of the adjacent regions and the blank region, and between the other of the adjacent regions and the blank region. The structural boundary lines on both sides of the blank region can move in the direction where the blank region is reduced. However, the distance between their structural boundary lines on the both sides is not allowed to become equal to or smaller than the predetermined value, whereby the blank region can be left.

In the above example, although a case that an original sentence and a translated sentence are inserted together into a region is exemplified, the similar processing is applicable also in case that only a translated sentence is inserted. Further, the above-mentioned processing is applicable also in case that a result of other conversion processing (for example, processing of enlarging a font size of a character string determined as a keyword) than translation, which has been applied to an original sentence is inserted into a region. Further, although the case of horizontal writing is exemplified above, the similar processing is applicable also in a case of vertical writing.

Figure 12:
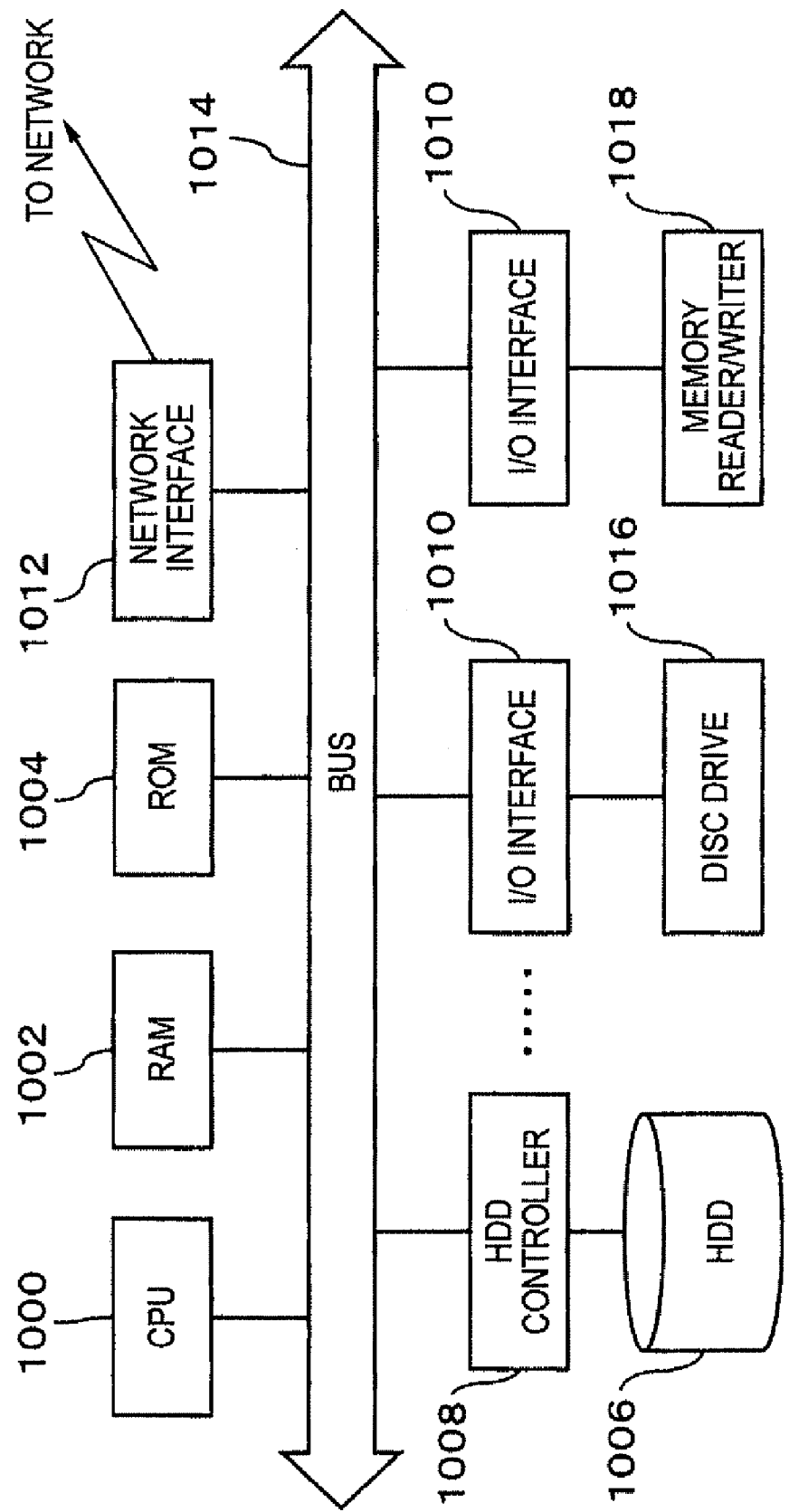
FIG. 12 is a diagram showing an example of hardware configuration of a computer.

Of the document processing apparatus described above referring to in FIG. 1, the sections except the image reading device 10 are realized by making a general purpose computer execute a program indicating processing of each above-mentioned functional module. Here, the computer has the circuit configuration as shown in FIG. 12, in which as hardware, a microprocessor such as CPU 100, memories (primary memories) such as a random access memory (RAM) 1002 and a read-on memory (ROM) 1004, an HDD controller 1008 for controlling HDD (hard disc drive) 1006, various I/O (input/output) interfaces 1010, and a network interface 1012 which performs control for connection with a network such as a local area network are connected through a bus 1014 to one another. Further, to its bus 1014, a disc drive 1016 for reading or/and writing on a portable type disk recording medium such as CD or DVD, and a memory reader/writer 1018 for reading and/or writing on a portable type nonvolatile recording medium having various standards, such as a flash memory may be connected, for example, through the I/O interfaces 1010. The program in which processing contents of each function module exemplified above are stored is saved in a fixed memory unit such as a hard disc drive through the recording medium such as CD or DVD, or through communication unit such as a network, and installed to the computer. The program stored in the fixed memory unit is read out by the RAN 1002, and executed by the microprocessor such as the CPU 1000, whereby the above-exemplified functional module group is realized. Further, a part or the entire functional module group may be configured as a hardware circuit such as a dedicated LSI (Large Scale Integration), ASIC (Application Specific Integrated Circuit, or FPGA Wield Programmable Gate Array).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. A document processing apparatus comprising:
  a region extracting unit that extracts a plurality of regions in a document image;
  a recognition unit that recognizes a character string in each extracted region;
  a conversion unit that converts the recognized character string in each extracted region;
  a setting unit that sets first boundary lines that surrounds the document image and a second boundary line in a space between adjacent regions of the plurality of regions, wherein each second boundary line is a linear line extending to a position blocked by another region, the first boundary lines and the second boundary lines define cells for the respective regions, and each cell surrounds the corresponding region;
  an enlargement/reduction unit that moves in parallel a line of the first and second boundary lines under a restraint condition that the line does not intersect any of the plurality of regions, and enlarges or reduces a region in accordance with the parallel movement of the line so long as the region does not get out of the corresponding cell; and
  an insertion unit that inserts the converted character string into each of the regions at least one of which is enlarged or reduced by the enlargement/reduction unit.

2. The document processing apparatus according to claim 1, wherein
  when a distance between the adjacent regions is equal to or larger than a first threshold, the setting unit further sets a blank region in the space between the adjacent regions and sets one second boundary line respectively between one of the adjacent regions and the blank region, and another second boundary line between the other of the adjacent regions and the blank region; and
  when the blank region is set, the restraint condition in the enlargement/reduction unit allows at least one of the two second boundary lines adjacent to the blank region to move in parallel toward the blank region.

3. The document processing apparatus according to claim 2, wherein
  when the at least one of the two second boundary lines adjacent to the blank region are moved in parallel toward the blank region, the restraint condition in the enlargement/reduction unit indicates that a distance between the two second boundary lines adjacent to the blank region is equal to or larger than a second threshold.

4. A computer readable medium storing a program causing a computer to execute a process for a document processing, the process comprising:
- extracting a plurality of regions in a document image;
- recognizing a character string in each extracted region;
- converting the recognized character string in each extracted region;
- setting first boundary lines that surrounds the document image and at least one second boundary line in a space between adjacent regions of the plurality of regions, wherein each second boundary line is a linear line extending to a position blocked by another region, the first boundary lines and the second boundary line define cells for the respective regions, and each cell surrounds the corresponding region;
- enlarging and reducing to moves in parallel at least one line of the first and second boundary lines under a restraint condition that at least one line does not intersect any of the plurality of regions, and enlarges or reduces at least one of the regions in accordance with the parallel movement so long as each region does not get out of the corresponding cell; and
- inserting the converted character string into each of the regions at least one of which is enlarged or reduced by the enlargement/reduction unit.

* * * * *